United States Patent
Suzuki et al.

(10) Patent No.: US 11,064,089 B2
(45) Date of Patent: Jul. 13, 2021

(54) COMMUNICATION DEVICE AND METHOD FOR CONTROLLING THE SAME

(71) Applicant: CANON KABUSHIKI KAISHA, Tokyo (JP)

(72) Inventors: Takeshi Suzuki, Inagi (JP); Nobuyuki Bannai, Machida (JP); Akinori Horiuchi, Yokohama (JP); Arata Miyagi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/848,542

(22) Filed: Apr. 14, 2020

(65) Prior Publication Data

US 2020/0244836 A1 Jul. 30, 2020

Related U.S. Application Data

(63) Continuation of application No. 16/513,412, filed on Jul. 16, 2019, now Pat. No. 10,652,426, which is a (Continued)

(30) Foreign Application Priority Data

Apr. 28, 2016 (JP) .................................. 2016-091438

(51) Int. Cl.
*H04N 1/08* (2006.01)
*H04N 1/32* (2006.01)
(Continued)

(52) U.S. Cl.
CPC ........ *H04N 1/32641* (2013.01); *B41J 3/4071* (2013.01); *G06F 3/1205* (2013.01); *G06F 3/1232* (2013.01); *G06F 3/1285* (2013.01); *G06F 11/0736* (2013.01); *G06F 11/0751* (2013.01); *G06F 11/0769* (2013.01); *G06F 13/4068* (2013.01); *G06F 13/42* (2013.01); *H04N 1/00204* (2013.01); *H04N 1/00339* (2013.01); *H04N 1/00973* (2013.01); *H04N 1/32117* (2013.01); *H04N 1/32694* (2013.01); *G03G 2215/00109* (2013.01); *G06F 3/1255* (2013.01); *H04N 2201/0094* (2013.01); *H04N 2201/216* (2013.01)

(58) Field of Classification Search
CPC .......................... H04N 1/32641; B41J 3/4071
See application file for complete search history.

(56) References Cited

U.S. PATENT DOCUMENTS 8,405,866 B2 * 3/2013 Abe ....................... G06K 15/02
358/1.18
2007/0109601 A1 * 5/2007 Mitani ....................... B41J 3/44
358/1.18

* cited by examiner

*Primary Examiner* — Ibrahim Siddo
(74) *Attorney, Agent, or Firm* — Canon U.S.A., Inc. IP Division

(57) ABSTRACT

A communication device includes a first holding unit which holds a disk-like first recording medium capable of storing information and a second holding unit which holds a second recording medium which is different from the first recording medium. The communication device further includes a request reception unit configured to receive a request for information indicating a recording medium which is usable by the communication device from a terminal device, and a transmission unit configured to transmit information indicating the first recording medium and information indicating the second recording medium held by the second holding unit to the terminal device when the request is received.

20 Claims, 10 Drawing Sheets

Related U.S. Application Data continuation of application No. 16/049,347, filed on Jul. 30, 2018, now Pat. No. 10,375,268, which is a continuation of application No. 15/495,700, filed on Apr. 24, 2017, now Pat. No. 10,057,456.

(51) Int. Cl.
*G06F 13/42* (2006.01)
*G06F 13/40* (2006.01)
*G06F 11/07* (2006.01)
*H04N 1/00* (2006.01)
*B41J 3/407* (2006.01)
*G06F 3/12* (2006.01)

COMMUNICATION DEVICE AND METHOD FOR CONTROLLING THE SAME

CROSS-REFERENCE TO RELATED APPLICATIONS

This application is a Continuation of U.S. patent application Ser. No. 16/513,412, filed Jul. 16, 2019, which is a Continuation of U.S. patent application Ser. No. 16/049,347, filed Jul. 30, 2018, now U.S. Pat. No. 10,375,268, which is a Continuation of U.S. patent application Ser. No. 15/495,700, filed Apr. 24, 2017, now U.S. Pat. No. 10,057,456, which claims the benefit of Japanese Patent Application No. 2016-091438, filed Apr. 28, 2016, all of which are hereby incorporated by reference herein in their entirety.

BACKGROUND OF THE INVENTION

Field of the Invention

The present invention relates to a communication device and a method for controlling the communication device.

Description of the Related Art

A communication system in which a terminal device, such as a personal computer, allows a user to input print setting information and a communication device, such as a printer, processes a print job based on the input print setting information has been used.

In the communication system, the terminal device obtains information indicating a recording medium held by the communication device (medium information) and displays content corresponding to the obtained medium information in a display unit as print setting information selectable by the user.

Japanese Patent Laid-Open No. 2010-163242 discloses a multifunction peripheral which transmits information indicating a recording sheet on a sheet feeding tray to an information processing terminal and an information processing terminal which displays a print instruction screen in which the recording sheet information received from the multifunction peripheral is reflected and which accepts an input of a print setting performed by a user on the print instruction screen.

In general, a recording medium, such as a disk medium, is set in a communication device by a user immediately before printing, and therefore, the recording medium is not held by the communication device when media information is transmitted. Therefore, in the embodiment disclosed in Japanese Patent Laid-Open No. 2010-163242, information indicating a recording medium which is not held by the communication device when the medium information is transmitted may not be transmitted to the terminal device as medium information. Accordingly, content corresponding to the information indicating the recording medium which is not held by the communication device at the time of transmission of the medium information may not be selected by the user as print setting information, and therefore, usability may be deteriorated.

SUMMARY OF THE INVENTION

According to an embodiment of the present invention, a communication device includes a first holding unit which is configured to hold a disk-like first recording medium capable of storing information, a second holding unit which is configured to hold a second recording medium which is different from the first recording medium, and at least one processor. The at least one processor perform operations including registering information indicating the second recording medium held by the second holding unit, receiving a request for information indicating a recording medium which is usable by the communication device from a terminal device, and transmitting information indicating the first recording medium and information indicating a recording medium corresponding to the registered information to the terminal device when the request is received. Print setting information corresponding to the first recording medium is displayed in the terminal device so as to be selectable by a user when the information indicating the first recording medium is transmitted to the terminal device. Print setting information corresponding to a recording medium corresponding to the registered information is displayed in the terminal device so as to be selectable by the user when the information indicating the recording medium corresponding to the registered information is transmitted to the terminal device.

According to another embodiment of the present invention, a communication device includes a first holding unit which is configured to hold a disk-like first recording medium capable of storing information, a second holding unit which is configured to hold a second recording medium which is different from the first recording medium, and at least one processor. The at least one processor includes receiving a request for information indicating a recording medium which is usable by the communication device from a terminal device, and transmitting information indicating the first recording medium and information indicating the second recording medium held by the second holding unit to the terminal device when the request is received. Print setting information corresponding to the first recording medium is displayed in the terminal device so as to be selectable by a user when the information indicating the first recording medium is transmitted to the terminal device. Print setting information corresponding to the second recording medium held by the second holding unit is displayed in the terminal device so as to be selectable by the user when the information indicating the second recording medium held by the second holding unit is transmitted to the terminal device.

Further features of the present invention will become apparent from the following description of exemplary embodiments with reference to the attached drawings.

DESCRIPTION OF THE EMBODIMENTS

A preferred embodiment of the present invention will be described hereinafter with reference to the accompanying drawings. Note that modifications and alterations appropriately performed on the embodiment below based on knowledge of those skilled in the art without departing from the scope of the invention are also included in the invention.

A terminal device and a communication device included in a communication system of this embodiment will be described. Although a personal computer (PC) is illustrated as the terminal device in this embodiment, the terminal device is not limited to a PC. Specifically, a mobile terminal, a smart phone, a tablet terminal, a personal digital assistance (PDA), a digital camera, or the like may be used as the terminal device. Although an inkjet printer is illustrated as the communication terminal in this embodiment, the communication terminal is not limited to an inkjet printer as long as the communication terminal is capable of transmitting medium information described below to the terminal device. Therefore, the communication device of this embodiment may be a printer employing any one of methods including a toner electrophotographic method and a sublimation method. Although the communication device of this embodiment only has an image forming function, the present invention is not limited to this and the communication device may additionally have a reading device which reads an image on a document so as to function as a copy machine or may additionally have other functions so as to function as a multifunction peripheral. Furthermore, various types of recording medium (a medium to be subjected to recording or a recording sheet) may be used in an image forming process as long as the image forming process may be performed on the recording medium. Examples of the recording medium include white plain paper, photo paper, color paper other than white paper, special paper of a metallic color to which a film or aluminum is pasted, and an overhead projector (OHP) sheet. Furthermore, the communication device may be capable of not only performing printing on a cut sheet which is cut in advance in a predetermined size but also performing printing on a continuous sheet. Furthermore, the communication device may perform not only color recording using a plurality of color recording materials but also monochrome recording only using black (including gray). Moreover, examples of the printing controlled by the communication device may include not only printing of a visible image but also printing of an image which is not visible or difficult to be seen. The examples of the printing may further include printing of a wiring pattern, a physical pattern in fabrication of components, DNA base sequence, and the like. Specifically, various types of device may be used as the communication device as long as the communication device is capable of applying recording material to a recording medium.

Figure 1:
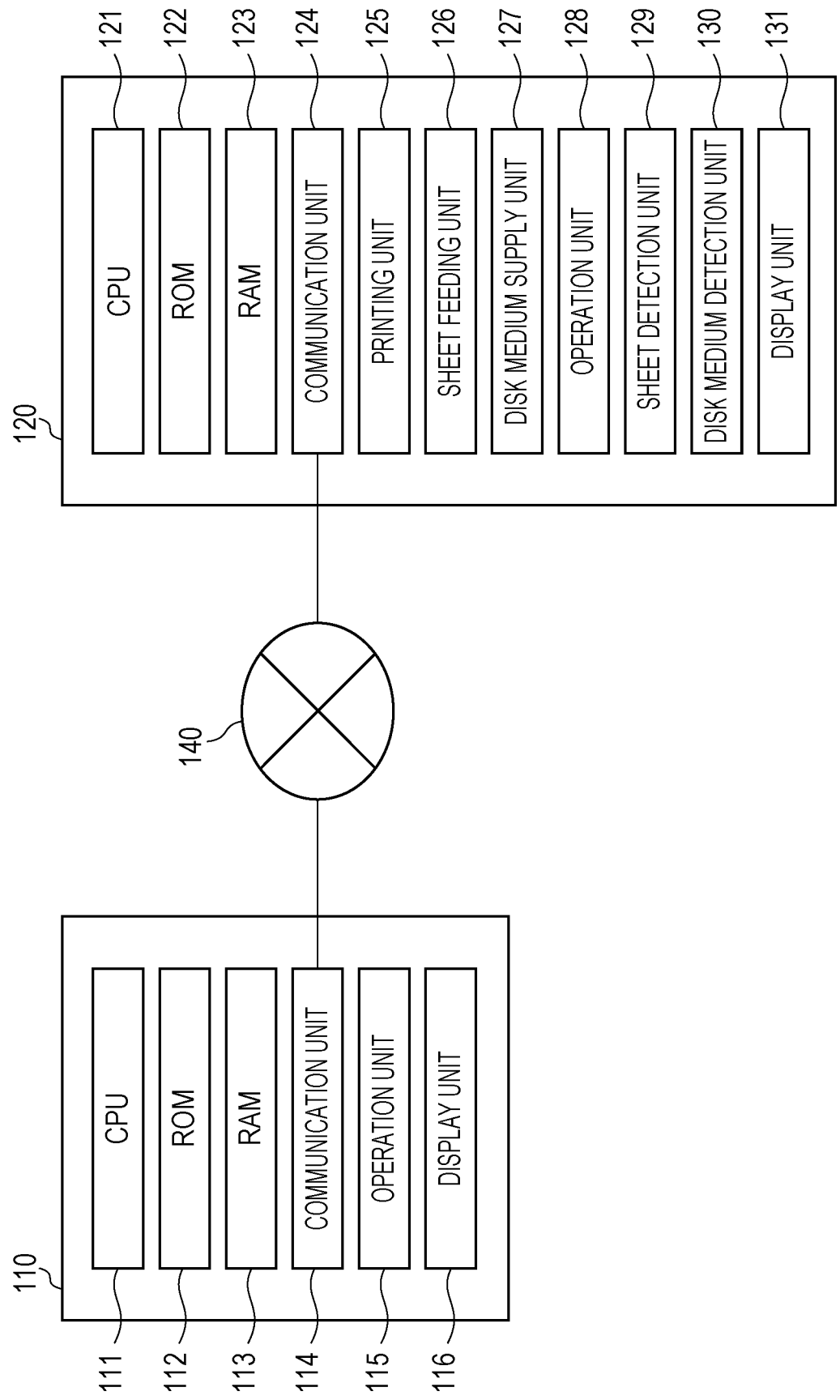
FIG. 1 is a diagram illustrating a configuration of a communication system according to an embodiment of the present invention.

First, a configuration of the communication system according to this embodiment will be described with reference to a block diagram of FIG. 1. Although the configuration is described as below in this embodiment, functions are not particularly limited to those described with reference to FIG. 1.

The communication system of this embodiment includes a terminal device 110 which generates a print job and a communication device 120 which receives the print job from the terminal device and executes printing in accordance with the print job.

The terminal device 110 includes a central processing unit (CPU) 111, a read only memory (ROM) 112, a random access memory (RAM) 113, a communication unit 114, an operation unit 115, and a display unit 116.

The CPU 111 is a system controller which controls the entire terminal device 110 by executing programs stored in the ROM 112 and activating hardware. The CPU 111 generates a print job for causing the communication device 120 to execute printing.

The ROM 112 stores fixed data including control programs to be executed by the CPU 111, data tables, an embedded operating system (OS) program. In this embodiment, the control programs stored in the ROM 112 perform software execution control including scheduling, task switching, and an interruption process under control of the embedded OS stored in the ROM 112.

The RAM 113 is a static random access memory (SRAM) or a dynamic random access memory (DRAM). Note that the RAM 113 may store data by a primary battery, not illustrated, for data backup. In this case, the RAM 113 may store important data including program control variables without volatilization. Furthermore, the RAM 113 includes a memory area for storing setting information of the terminal device 110, management data of the terminal device 110, and the like. The RAM 113 is also used as a main memory and a work memory of the CPU 111.

The communication unit 114 is a component used for connection to the communication device 120 or the like and executes data communication. The communication unit 114 is connected to an access point (not illustrated) included in the communication device 120, for example, for the connection to the communication device 120. Since the communication unit 114 is connected to the access point included in the communication device 120, the terminal device 110 and the communication device 120 may communicate with each other. The communication unit 114 may be directly connected to the communication device 120 by wireless communication or may be connected to the communication device 120 through an external apparatus installed outside the terminal device 110 and the communication device 120. Examples of the external apparatus include an external access point (an access point 140 or the like) installed outside the terminal device 110 and the communication device 120 and a device capable of relaying communication, such as an external server. As a wireless communication method, wireless fidelity (Wi-Fi) (registered trademark), Bluetooth (registered trademark), or the like may be employed. Note that the communication unit 114 may be connected to another device through a wired local area network (LAN), a universal serial bus (USB), or the like instead of the wireless communication method. Furthermore, examples of the external access point include a wireless LAN router.

Note that, in this embodiment, a method for directly connecting the terminal device 110 and the communication device 120 to each other without an external apparatus, such as an external access point, is referred to as a "direct connection method". A method for connecting the terminal device 110 and the communication device 120 to each other through an external apparatus is referred to as an "infrastructure connection method". In this embodiment, the terminal device 110 transmits a print job for causing the communication device 120 to perform printing to the communication device 120 through the communication unit 114. The job to be transmitted is not limited to the print job, and may be a scan job which causes the communication device 120 to perform scanning, a copy job which causes the communication device 120 to perform copying, a setting command for changing a setting of the communication device 120, or the like.

The operation unit 115 is an interface for accepting a user input and includes a physical keyboard, buttons, and a touch panel. In this embodiment, the terminal device 110 receives an input of setting information required for generation of a print job from a user through the operation unit 115.

The display unit 116 is constituted by a light emitting diode (LED), a liquid crystal display (LCD), and the like, and performs display of data and transmission of a notification indicating a state of the communication device 120. The terminal device 110 may include a software keyboard including a numerical input key, a mode setting key, a determination key, a cancelling key, a power source key, and the like on the display unit 116 so as to accept a user input through the display unit 116. Specifically, a portion of the display unit 116 and a portion of the operation unit 115 may be integrated so that screen output and acceptance of a user operation are performed in the same screen.

The communication device 120 includes a CPU 121, a ROM 122, a RAM 123, a communication unit 124, a printing unit 125, a sheet feeding unit 126, a disk medium supply unit 127, an operation unit 128, a sheet detection unit 129, a disk medium detection unit 130, and a display unit 131.

The CPU 121 is a system controller which controls the entire communication device 120 by executing programs stored in the ROM 122 and activating hardware.

The ROM 122 stores fixed data including control programs to be executed by the CPU 121, data tables, an embedded OS program. In this embodiment, the control programs stored in the ROM 122 perform software execution control including scheduling, task switching, and an interruption process under control of the embedded OS stored in the ROM 122.

The RAM 123 is constituted by an SRAM or a DRAM. Note that the RAM 123 may store data by a primary battery, not illustrated, for data backup. In this case, the RAM 123 may store important data including program control variables without volatilization. Furthermore, the RAM 123 includes a memory area for storing setting information of the communication device 120, management data of the communication device 120, and the like. The RAM 123 is also used as a main memory and a work memory of the CPU 121.

The communication unit 124 is a component used for connection to the communication device 110, the access point 140, and the like and executes data communication. The communication unit 124 has an access point for connection to a device, such as the terminal device 110, as an internal access point of the communication device 120. Note that, when the access point is connected to the communication unit 114, the communication unit 124 may directly communicate with the terminal device 110 through wireless communication. Note that the communication unit 124 may directly communicate with the terminal device 110 or may communicate with the terminal device 110 through the access point 140. As a wireless communication method, Wi-Fi (registered trademark), Bluetooth (registered trademark), or the like may be employed. Note that the communication unit 124 may be connected to another apparatus through a wired LAN, a USB, or the like instead of the wireless communication method. Furthermore, the communication unit 124 may include hardware functioning as an access point or operate as an access point using software functioning as an access point. In this embodiment, the communication device 120 receives various jobs from the terminal device 110 through the communication unit 124.

The printing unit 125 executes an image forming process (a printing process) of forming an image on a recording medium, such as a sheet or a disk medium, using recording material, such as ink, in accordance with information stored in the RAM 123 or a print job received from the terminal device 110 or the like and outputs a result of the printing.

The sheet feeding unit 126 holds a recording medium for printing, and supplies the recording medium to the printing unit 125 under control of the CPU 121. It is assumed here that the sheet feeding unit 126 holds and supplies a recording medium (a sheet in this embodiment) other than a disk medium described below in this embodiment. Furthermore, it is assumed here that the sheet feeding unit 126 is an auto sheet feeder (ASF). The sheet feeding unit 126 may not be the ASF or may be constituted by a plurality of sheet feeding units.

The disk medium supply unit 127 holds a recording medium for printing, and supplies the recording medium to the printing unit 125 under control of the CPU 121. The disk medium supply unit 127 is holds and supplies a disk-like recording medium capable of storing information in this embodiment. Examples of the disk medium include a compact disc (CD), a digital versatile disk (DVD), and a Blu-ray (registered trademark) disc (BD). Although the disk medium supply unit 127 has a tray (a disk medium tray) which stores a disk medium in this embodiment, the present invention is not limited to this. Specifically, a disk medium may be directly set to the communication device 120 without using the disk medium tray.

Figure 4:
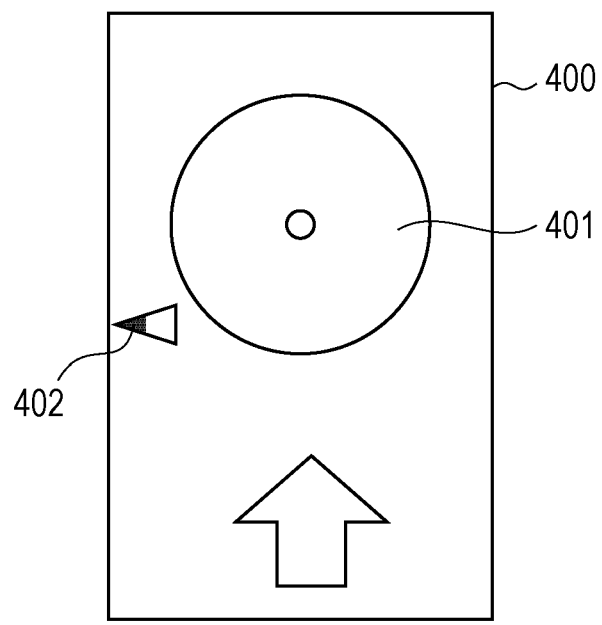
FIG. 4 is a diagram illustrating appearance of a disk medium tray according to the embodiment of the present invention.

FIG. 4 is a diagram illustrating appearance of the disk medium tray. A user sets and fixes a disk medium to be subjected to printing in a set position 401 on a disk medium tray 400. Then the user inserts the disk medium tray 400 into the disk medium supply unit 127 using a positioning mark 402. Specifically, the user inserts the disk medium tray 400 to a position in which a positioning mark, not illustrated, included in the disk medium supply unit 127 matches the positioning mark 402. When the disk medium tray 400 is appropriately inserted into the disk medium supply unit 127, the communication device 120 becomes available for execution of disk medium printing described below.

The operation unit 128 is an interface for accepting a user input and is constituted by a physical keyboard, buttons, and a touch panel. In this embodiment, the communication device 120 accepts an input of information in a screen displayed in the display unit 131, an instruction for continuance of the printing, and the like from the user through the operation unit 128.

The sheet detection unit 129 performs a detection of a sheet held in the sheet feeding unit 126 by a general detection method so as to determine whether a sheet is held in the sheet feeding unit 126.

The disk medium detection unit 130 performs a detection of a disk medium held in the disk medium supply unit 127 by a general detection method so as to determine whether a disk medium is held in the disk medium supply unit 127.

The display unit 131 is constituted by an LED, an LCD, and the like, and performs display of data and transmission of a notification indicating a state of the communication device 120. The communication device 120 may include a software keyboard including a numerical input key, a mode setting key, a determination key, a cancelling key, a power source key, and the like on the display unit 131 so as to accept a user input through the display unit 131. Specifically, a portion of the display unit 131 and a portion of the operation unit 128 may be integrated so that screen output and acceptance of a user operation are performed in the same screen.

Note that the user may register medium information in the communication device 120 through the operation unit 128 and the display unit 131. In the registration of medium information, a medium (a recording medium) set in the communication device 120 is registered. When the medium information is registered, the registered information is stored in the RAM 123. The communication device 120 may recognize a set medium, that is, a medium to be used for printing with reference to the registered information.

The user may perform a setting indicating whether the communication device 120 accepts the disk medium printing through the operation unit 128 and the display unit 131 (an acceptance setting). Information indicating the setting is stored in the RAM 123 similarly to the registration information of the medium information. Furthermore, as will be described below with reference to FIGS. 2 and 3, the user may perform the registration of medium information and the acceptance setting through the terminal device 110 without using the operation unit 128 and the display unit 131 by using a remote user interface (UI) function. The remote UI function enables a remote operation of the communication device 120 by displaying a screen for operating the communication device 120 in the terminal device 110.

Furthermore, the communication device 120 may execute "disk medium printing" which is a printing method for performing printing on a disk medium and "sheet medium printing" which is a printing method for performing printing on a recording medium other than a disk medium (such as a sheet) in this embodiment. The terminal device 110 transmits a print job to cause the communication device 120 to execute printing. The print job includes information indicating one of the printing methods to be used in the printing. This information is referred to as "print setting information", for example.

Furthermore, when the number of network supporting apparatuses, such as communication devices and terminal devices, is increased, a communication protocol between the devices in a network, a system of discovery of the devices, a system of installation of the devices, and a specification of a printing service are standardized. Examples of the standardized communication protocol (standard system protocol) include an internet printing protocol (IPP) and a web services on devices (WSD). Furthermore, in addition to the standard system protocol, a communication protocol uniquely developed by a printer vender may be used (non-standard system protocol). In this embodiment, when different protocols are used, different screens are displayed in the terminal device 110 in printing and information transmitted and received by the terminal device 110 and the communication device 120 has different formats. Note that the print job transmitted from the terminal device 110 includes information indicating a used communication protocol, and therefore, the communication device 120 which receives the print job may recognize the used communication protocol with reference to the information.

A method for executing printing in accordance with the standard system protocol will now be described. First, the terminal device 110 accepts a user operation in a state in which image/document data to be printed is specified and installs a predetermined printer driver (a standard driver) for executing printing by the communication device 120 in accordance with the standard system protocol. Thereafter, the terminal device 110 transmits a request for transmitting a notification indicating medium information described below to the communication device 120 so as to obtain the medium information and display a print setting screen corresponding to the medium information. Subsequently, when accepting an input of a print setting performed by the user so that printing is instructed, the terminal device 110 issues a print job based on the image/document data to be printed and the accepted print setting and transmits the print job to the communication device 120 in accordance with the standard system protocol. In this way, the printing based on the standard system protocol is executed. Once the standard system driver is installed, the same process is not executed again. Specifically, next printing may be executed in accordance with the standard system protocol when the user activates the installed standard system driver. Note that, in this embodiment, the terminal device 110 requests transmission of a notification of medium information every time the standard system driver is activated and performs obtainment of the medium information and display of a print setting screen corresponding to the obtained medium information. This is because the medium information indicates a medium currently held by the communication device 120, and therefore, the medium information may be changed. Note that, in the standard system protocol printing, the communication device 120 executes the disk medium printing when "12 cm×12 cm" is set as medium size information, "disk" is set as medium type information, and "disk" is set as supply unit information in the received print job. Furthermore, the communication device 120 executes the sheet medium printing when content other than "disk" is set as the medium type information and "ASF" is set as the supply unit information in the received print job.

Next, a method for executing printing in accordance with the non-standard system protocol will be described. First, the terminal device 110 accepts a user operation in a state in which image/document data to be printed is specified and installs a predetermined printer driver (a non-standard system driver) for executing printing by the communication device 120 in accordance with the non-standard system protocol. The non-standard system driver is a printer vender-specific printer driver which is unique to a machine model of the communication device 120. The terminal device 110 obtains information indicating a function executable by the communication device 120 (functional information) when the non-standard system driver is installed. Then the terminal device 110 displays a print setting screen in which an option corresponding to the function executable by the communication device 120 may be displayed. Subsequently, when accepting an input of the print setting performed by the user so that printing is instructed, the terminal device 110 issues a print job based on the image/document data to be printed and the accepted print setting and transmits the print job to the communication device 120 in accordance with the non-standard system protocol. In this way, the printing based on the non-standard system protocol is executed. Once the non-standard system driver is installed and a communication device is selected, the same processes are not executed again. Specifically, next printing may be executed in accordance with the non-standard system protocol when the user activates the installed non-standard system driver. Note that the terminal device 110 obtains the functional information when the non-standard system driver is installed in this embodiment. Specifically, the terminal device 110 does not obtain the functional information every time the non-standard system driver is activated. This is because the functional information indicates the function executable by the communication device 120 as described above, and therefore, it is unlikely that the functional information is changed.

Figure 2:
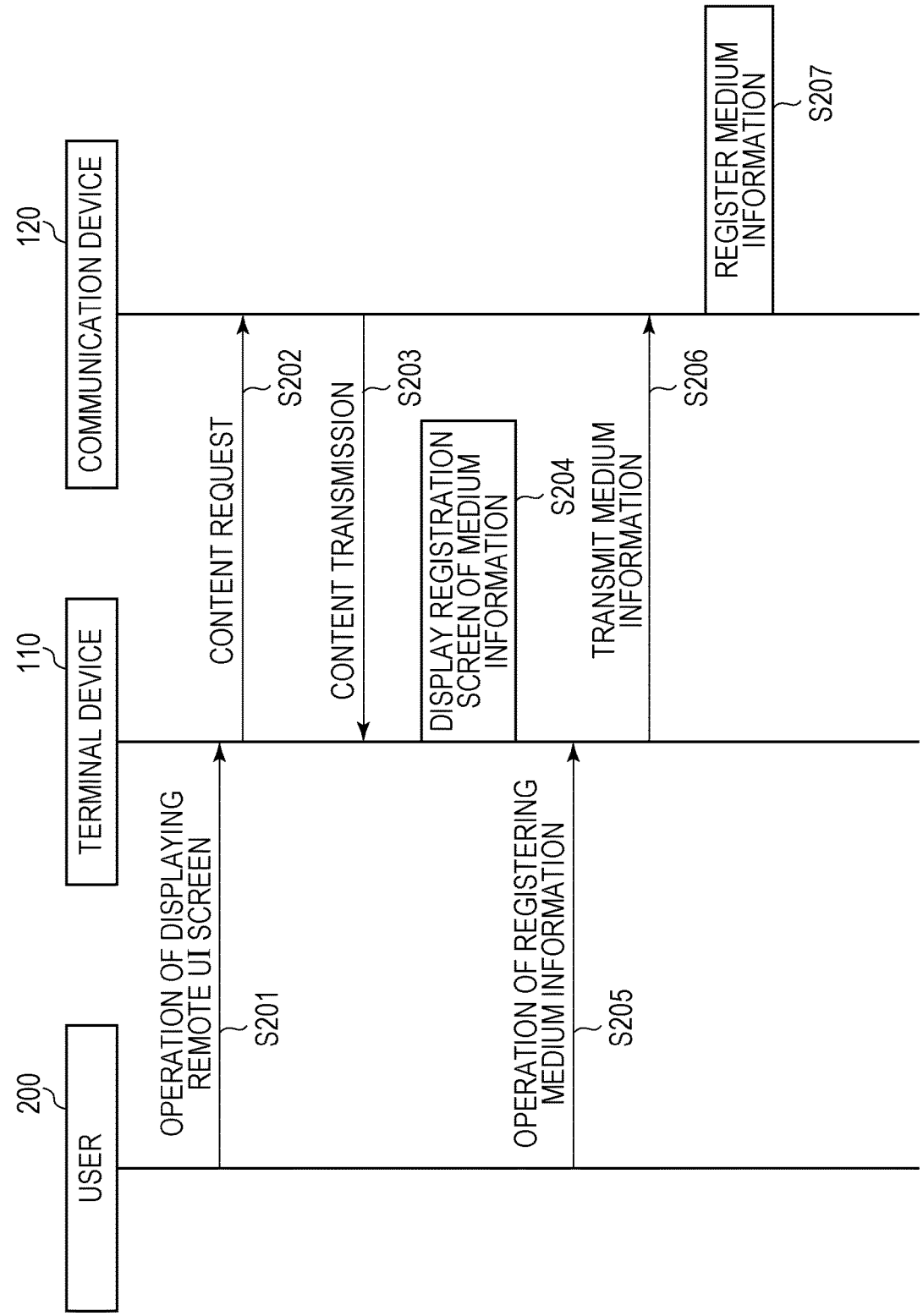
FIG. 2 is a sequence diagram illustrating a process of registering medium information according to the embodiment of the present invention.

FIG. 2 is a sequence diagram of a process of registering information indicating a medium set in the sheet feeding unit 126 of the communication device 120 (a medium information registration process) performed by the terminal device 110 in this embodiment. When the medium information registration process is performed, the communication device 120 may recognize the medium set in the sheet feeding unit 126. Note that processes to be executed by the devices in this sequence diagram are realized when the CPUs included in the devices read various programs stored in the memories included in the devices into the RAMs included in the devices and execute the programs. The sequence diagram is started in a state in which the terminal device 110 activates a browser application and executes the remote UI function. The terminal device 110 may execute the remote UI function when an IP address of a communication device to be operated is input to the browser application or when a remote UI function execution button is pressed in a screen displayed by the printer driver.

First, in step S201, a user 200 performs an operation for executing the medium information registration process on the terminal device 110. Specifically, the user 200 performs an operation for displaying a screen corresponding to the medium information registration process (a medium information registration screen) in the display unit 116.

In step S202, the terminal device 110 requests information for displaying the medium information registration screen to the communication device 120 in accordance with the accepted operation.

In step S203, the communication device 120 transmits information for displaying the medium information registration screen stored in the memory, such as the ROM 122 or the RAM 123, to the terminal device 110.

In step S204, the terminal device 110 displays the medium information registration screen through the browser application in accordance with the information received from the communication device 120 in step S203.

Figure 3:
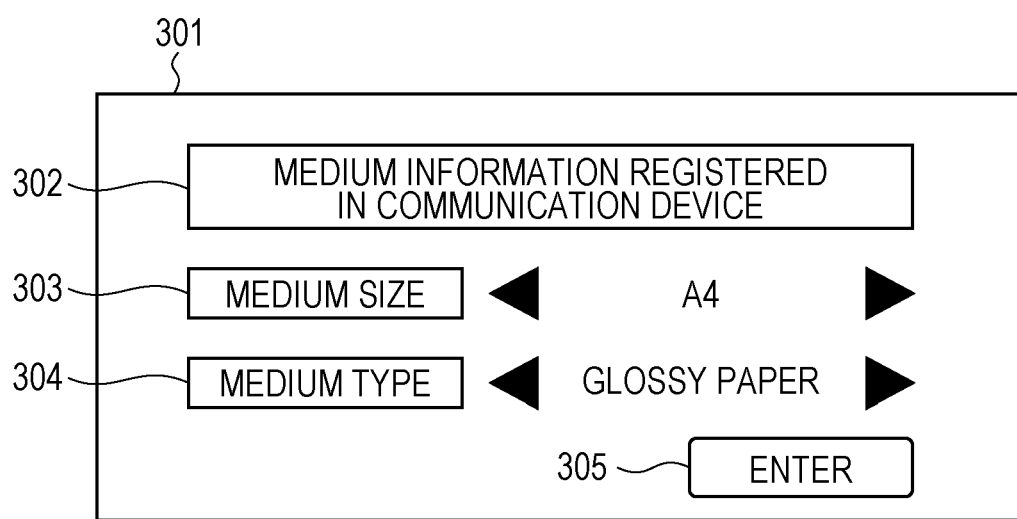
FIG. 3 is a diagram illustrating a screen for registering the medium information according to the embodiment of the present invention.

FIG. 3 is a diagram illustrating the medium information registration screen. A medium information registration screen 301 includes a screen title 302, a medium size 303, and a medium type 304 displayed thereon. The medium size 303 indicates a size of a medium set in the sheet feeding unit 126, and the medium type 304 indicates a type of the medium set in the sheet feeding unit 126. The user 200 may select one of sizes "A4", "4×6", "12 cm×12 cm", "postcard", "letter", and the like as setting content of the medium size 303. The user 200 may select one of types "glossy paper", "mat paper", "silky tone paper", "plain paper", and the like as setting content of the medium type 304. The user 200 may arbitrarily change information input in the medium size 303 and the medium type 304 by performing a medium information registration operation described below so as to arbitrarily change medium size information and medium type information to be registered in the communication device 120. A determination button 305 is pressed when the input is completed. When the determination button 305 is pressed, the terminal device 110 records the input information in the RAM 113. In the example of FIG. 3, the medium size of A4 and the medium type of glossy paper have been input in the screen.

In step S205, the user 200 performs the medium information registration operation while checking the medium information registration screen 301. The user 200 inputs arbitrary information in the medium size 303 and the medium type 304, and presses the determination button 305 when the input is completed.

In step S206, the terminal device 110 transmits the medium information generated based on the medium information registration operation to the communication device 120.

In step S207, the communication device 120 stores the received medium information in the memory, such as the RAM 123, so as to register the medium information.

In this way, the user 200 may perform the medium information registration process by a remote operation through the terminal device 110 using the remote UI function. Furthermore, the user 200 may register the medium information in the communication device 120 which does not include an operation unit and a display unit, for example, using the remote UI function. The user 200 may execute the medium information registration process by directly operating the communication device 120 at a time of a setting of a sheet feeding tray, for example, without using the remote UI function.

Figure 10:
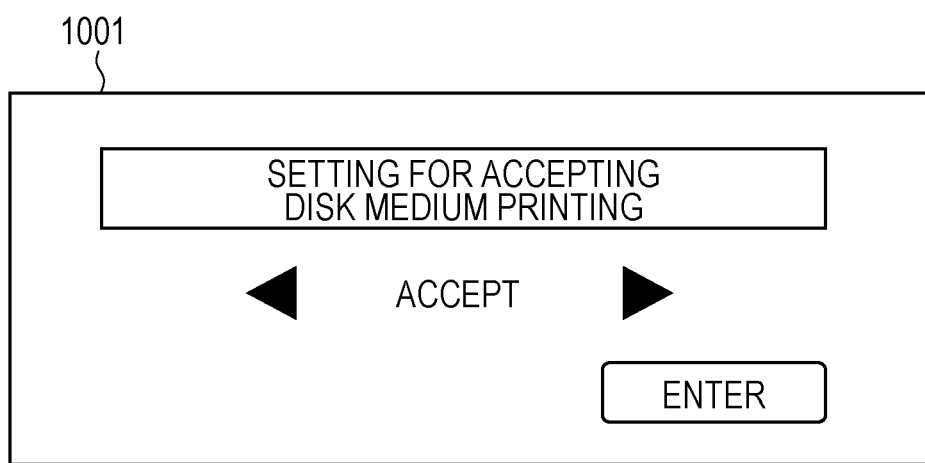
FIG. 10 is a diagram illustrating an acceptance setting screen according to the embodiment of the present invention.

Furthermore, the user 200 may determine whether the disk medium printing described below is to be accepted by the communication device 120 by performing the same operation using the remote UI function. Specifically, in step S201, the user 200 performs an operation of determining whether the disk medium printing is to be performed on the terminal device 110. By this, a screen for determining whether the disk medium printing is to be accepted (an acceptance setting screen 1001) is displayed in the display unit 116 in step S204 as illustrated in FIG. 10, and therefore, the user 200 inputs an arbitrary setting in step S205. Specifically, the user 200 inputs a result of the determination as to whether the disk medium printing is to be accepted. In step S206, the terminal device 110 transmits setting information based on the input by the user 200 to the communication device 120. The communication device 120 thereafter determines whether the disk medium printing is to be performed in accordance with the received setting information. By this, the disk medium printing acceptance setting is completed. Note that the setting described above may be applied only to the disk medium printing based on the standard system protocol.

Figure 5:
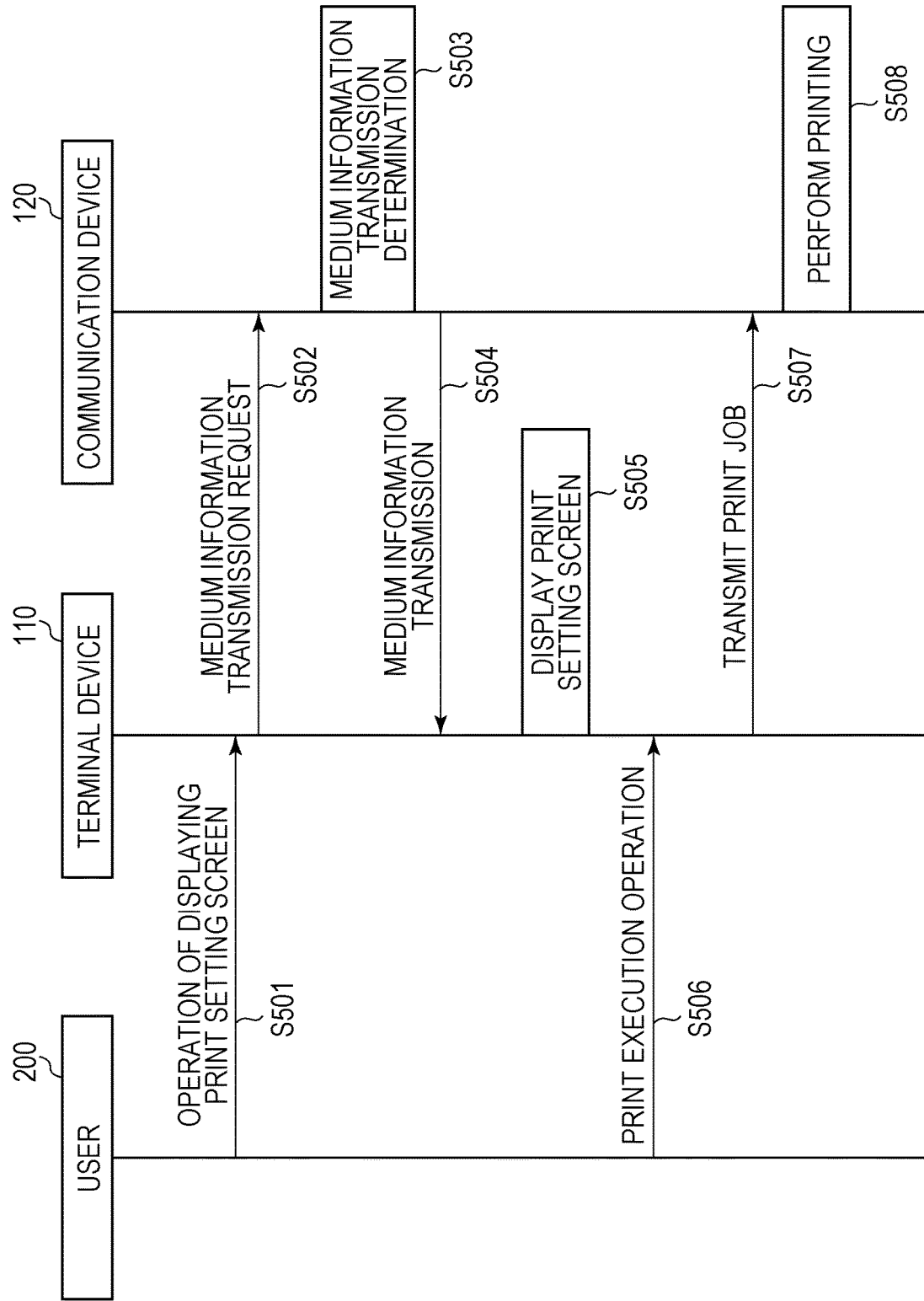
FIG. 5 is a sequence diagram illustrating a process, performed by a terminal device, of causing a communication device to perform printing according to the embodiment of the present invention.

FIG. 5 is a sequence diagram of a process, performed by the terminal device 110, of causing the communication device 120 to execute printing. Note that processes executed by the devices in this sequence diagram are realized when the CPUs included in the devices read various programs stored in the memories included in the devices into the RAMs included in the devices and execute the programs. Note that the communication among the devices is executed in accordance with the standard system protocol in a description below.

The terminal device 110 illustrated in FIG. 2 and the terminal device 110 illustrated in FIG. 5 may be different from each other. Specifically, registration of medium information and transmission of a print job may be performed by different terminal devices. Note that this sequence is started after the user 200 operates the terminal device 110 so as to select image data to be printed by the communication device 120.

In step S501, the user 200 performs a print setting screen display operation for displaying a print setting screen in the display unit 116 on the terminal device 110.

In step S502, the terminal device 110 transmits a medium information transmission request to the communication device 120 in accordance with the received print setting screen display operation. This operation is performed since an option of print setting information settable by the user 200 is based on medium information received from the communication device 120 in the print setting process based on the standard system protocol, for example.

In step S503, the communication device 120 performs medium information transmission determination in response to the received medium information transmission request. The medium information transmission determination is a process of specifying medium information to be transmitted to the terminal device 110. The medium information transmission determination will be described in detail with reference to FIG. 6.

Figure 6:
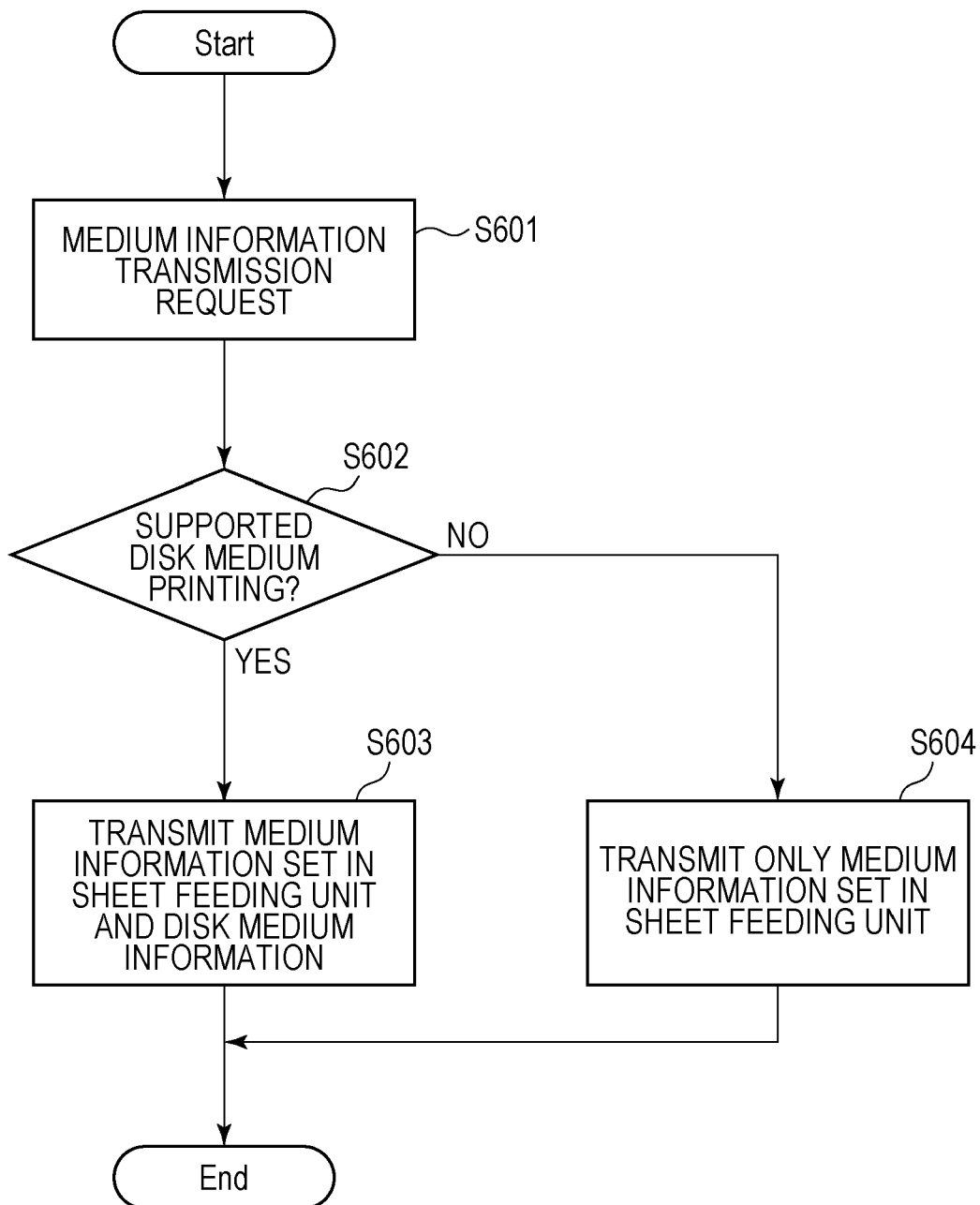
FIG. 6 is a flowchart of a process of determining transmission of medium information executed by the communication device according to the embodiment of the present invention.

FIG. 6 is a flowchart of the medium information transmission determination process executed by the communication device 120. The process of this flowchart is realized when the CPU 121 reads various programs stored in the memory, such as the ROM 122, into the RAM 123 and executes the programs. Furthermore, the process of this flowchart corresponds to the process in step S503, and therefore, is started when the process in step S502 is completed.

In step S601, the CPU 121 receives a medium information transmission request from the terminal device 110.

In step S602, the CPU 121 determines whether the disk medium information is to be transmitted to the terminal device 110. Specifically, this determination is made by the CPU 121 by determining whether the communication device 120 supports the disk medium printing, for example. The determination as to whether the communication device 120 supports the disk medium printing is made in accordance with information indicating a mechanism of the communication device 120, destination information, device model information of the communication device 120, and the setting information indicating whether the disk medium printing has been accepted in the acceptance setting described above. The CPU 121 determines that the communication device 120 supports the disk medium printing if the communication device 120 has a mechanism (a disk medium supply unit, for example) or a function which enables execution of the disk medium printing or if the user 200 accepts the disk medium printing. Specifically, the CPU 121 determines that the disk medium information is to be transmitted to the terminal device 110 and performs a process in step S603. On the other hand, the CPU 121 determines that the communication device 120 does not support the disk medium printing if the communication device 120 does not have a mechanism or a function which enables execution of the disk medium printing or if the user 200 does not accept the disk medium printing. Specifically, the CPU 121 determines that the disk medium information is not to be transmitted to the terminal device 110 and performs a process in step S604. Note that the CPU 121 determines that the communication device 120 does not support the disk medium printing if the user 200 does not accept the disk medium printing although the communication device 120 has a mechanism or a function which enables execution of the disk medium printing. The disk medium information is used to display the setting content of the disk medium printing in a print setting screen 701 as an option. Furthermore, the setting content of the disk medium printing is at least one of the medium size information "12 cm×12 cm", the medium type information "disk", and the supply unit information "disk" in this embodiment.

In step S603, the CPU 121 transmits the sheet medium information and the disk medium information to the terminal device 110. Here, in this embodiment, the CPU 121 determines that the disk medium information is transmitted to the terminal device 110 irrespective of a result of a determination as to whether a disk medium has been set in the disk medium supply unit 127.

In step S604, the CPU 121 transmits the sheet medium information to the terminal device 110. Specifically, the CPU 121 does not transmit the disk medium information to the terminal device 110.

When the process in step S603 or step S604 is terminated, the CPU 121 performs the process in step S504 and transmits the medium information to the terminal device 110 in accordance with transmission content determined in step S603 or step S604.

As described above, in the print setting process using the standard system protocol, for example, an option corresponding to the medium information transmitted to the terminal device 110 is displayed in the print setting screen. Furthermore, in the print setting process using the standard system protocol, for example, the communication device 120 generally transmits only sheet medium information registered in the medium information registration process, that is, information indicating a medium set in the sheet feeding unit 126 to the terminal device 110. However, in the medium information registration process, information indicating a disk medium may not be registered. This is because a disk medium is barely set in advance in the communication device 120 although the medium information registration is performed to cause the communication device 120 to recognize a medium which is currently set. Specifically, this is because the communication device 120 accepts a setting of a disk medium after receiving a print job corresponding to the disk medium printing due to mechanism restriction. Therefore, in the print setting process using the standard system protocol, the communication device 120 may not transmit the disk medium information as medium information to be transmitted to the terminal device 110. In addition, setting content of the disk medium printing may not be displayed in the print setting screen as an option, and therefore, the communication device 120 may not execute the disk medium printing.

Here, the communication device 120 of this embodiment transmits, in addition to the information registered in the medium information registration process, the disk medium information to the terminal device 110 in the transmission process in step S504. By this, setting content of the disk medium printing may be displayed in a print setting screen 701 as an option. Furthermore, the terminal device 110 may cause the communication device 120 to execute the print job associated with the disk medium printing. Furthermore, the CPU 121 transmits the disk medium information to the terminal device 110 in accordance with a result of a determination as to whether the communication device 120 supports the disk medium printing. When the communication device 120 does not support the disk medium printing, for example, the CPU 121 does not transmit the disk medium information to the terminal device 110. By this, the CPU 121 may reduce the number of options displayed in the print setting screen 701 and usability in the print setting may be improved.

The determination in step S602 may be performed by determining whether a sheet has been set in the sheet feeding unit 126. In this case, the CPU 121 detects a sheet set in the sheet feeding unit 126 using the sheet detection unit 129. When a sheet is detected, the CPU 121 determines that a sheet has been set in the sheet feeding unit 126. Specifically, the CPU 121 determines that the disk medium information is not to be transmitted to the terminal device 110 and performs a process in step S604. This is because it is highly likely that the disk medium printing is not performed but the sheet medium printing is performed when a sheet is set in the sheet feeding unit 126. On the other hand, when a sheet is not detected, the CPU 121 determines that a sheet has not been set in the sheet feeding unit 126. Specifically, the CPU 121 determines that the disk medium information is to be transmitted to the terminal device 110 and performs a process in step S603. This is because it is likely that any one of the sheet medium printing and the disk medium printing is performed when a sheet is not set in the sheet feeding unit 126.

Furthermore, the determination in step S602 may be performed by determining whether the communication device 120 has prepared for the disk medium printing, for example. In this case, the CPU 121 determines whether a disk medium has been set in the disk medium supply unit 127 using the disk medium detection unit 130. Furthermore, the CPU 121 determines whether a cover (an opening and closing member) for opening and closing an insertion slot to which a disk medium or a disk medium tray is inserted in the disk medium supply unit 127 is located in an open position for opening the insertion slot. The CPU 121 determines that the disk medium printing is prepared when it is determined that a disk medium has been set or the cover is located in the open position. Specifically, the CPU 121 determines that the disk medium information is to be transmitted to the terminal device 110 and performs the process in step S603. When the communication device 120 has prepared for the disk medium printing, it is highly likely that the printing using a disk medium is to be performed. On the other hand, the CPU 121 determines that the disk medium printing has not been prepared when it is determined that a disk medium has not been set or the cover is located in a close position for closing the insertion slot. Specifically, the CPU 121 determines that the disk medium information is not to be transmitted to the terminal device 110 and performs a process in step S604. When the communication device 120 has not prepared for the disk medium printing, it is not likely that the printing using a disk medium is to be performed.

Note that the CPU 121 may execute the determinations described above in combination in step S602. In this case, the CPU 121 performs the process in step S604 when it is determined that the disk medium information is not to be transmitted according to all the combined determinations. Then the CPU 121 performs the process in step S604 when it is determined that the disk medium information is to be transmitted in one of the combined determinations.

In this way, the CPU 121 may control the transmission of the disk medium information in accordance with a configuration and a setting state of the communication device 120 and states of the sheet feeding unit 126 and the disk medium supply unit 127.

Note that the CPU 121 may transmit the disk medium information and the sheet medium information every time the medium information transmission request is received from the terminal device 110, and in this case, the medium information transmission determination in step S503 may be omitted. In this case, an option of the disk medium printing is displayed every time in the print setting screen 701, and occurrence of a case where the option of the disk medium printing is not displayed due to an erroneous determination although the user desires to perform the disk medium printing may be suppressed.

Although the information registered in the medium information registration process is transmitted as the medium information transmitted in accordance with the medium information transmission request, the present invention is not limited to this. In a case where the communication device 120 has a function of detecting a medium set in the communication device 120 itself, for example, the CPU 121 may detect a medium set in the communication device 120 and transmit information indicating the detected medium. Also in this case, the CPU 121 transmits the disk medium information to the terminal device 110 when it is determined that the disk medium information is to be transmitted to the terminal device 110 irrespective of a determination as to whether a disk medium has been set in the disk medium supply unit 127.

In step S504, the communication device 120 transmits the medium information to the terminal device 110 in accordance with a result of the medium information transmission determination in step S503. Specifically, the communication device 120 transmits only the medium information (the sheet medium information) associated with a medium set in the sheet feeding unit 126 to the terminal device 110 when it is determined that the disk medium information is not to be transmitted in the medium information transmission determination. Specifically, the communication device 120 transmits only information corresponding to content registered in the medium information registration process to the terminal device 110. On the other hand, the communication device 120 transmits the disk medium information to the terminal device 110 in addition to the sheet medium information when it is determined that the disk medium information is to be transmitted in the medium information transmission determination. Note that the communication device 120 may transmit only the disk medium information to the terminal device 110 but not transmit the sheet medium information to the terminal device 110 when it is determined that the disk medium information is to be transmitted in the medium information transmission determination. This is because, in particular, it is highly likely that the sheet medium printing is not performed but the disk medium printing is performed when it is determined that the disk medium information is to be transmitted since a disk medium has been set in the disk medium supply unit 127. Note that the communication device 120 may execute the determinations described above in combination in step S602 and specify three patterns including a pattern in which the disk medium information is not to be transmitted, a pattern in which the disk medium information is to be transmitted, and a pattern in which only the disk medium information is to be transmitted. Specifically, when it is determined that a disk medium has been set in the disk medium supply unit 127, for example, it is determined that only the disk medium information is to be transmitted, and otherwise, the determination may be performed as described above. When it is determined that only the disk medium information is to be transmitted, the CPU 121 transmits only the disk medium information in step S504.

In step S505, the terminal device 110 displays a print setting screen in the display unit 116 using the medium information transmitted in step S504.

Figure 7:
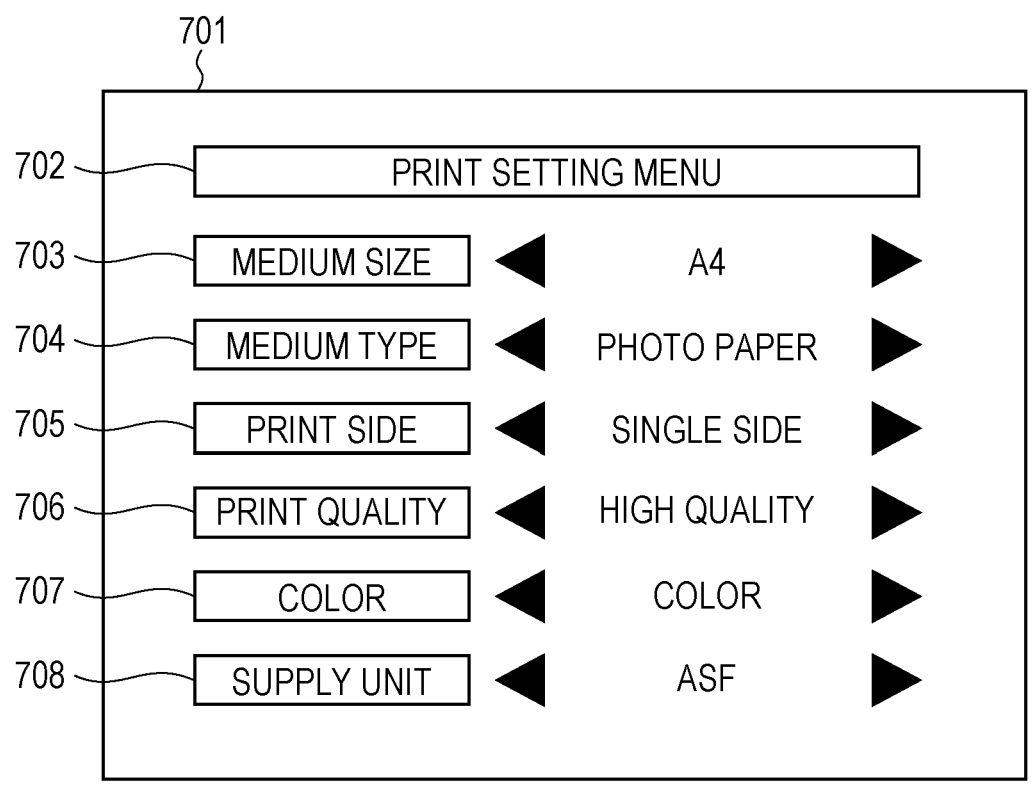
FIG. 7 is a diagram illustrating a print setting screen according to the embodiment of the present invention.

FIG. 7 is a diagram illustrating the print setting screen of this embodiment. The print setting screen is used to input setting information included in a print job to be transmitted in step S507. When receiving the print job, the communication device 120 executes printing in accordance with content of the setting information included in the print job (that is, content set using the print setting screen).

The print setting screen 701 includes a title 702 and setting items 703 to 708. The user 200 may change or set content of the setting items 703 to 708 using the operation unit 115. Options of the content of the setting items 703 to 708 correspond to the medium information transmitted in step S504. Specifically, when only the sheet medium information is included in the medium information, the user 200 may select content registered in the communication device 120 as the setting content of the setting items 703 to 708. On the other hand, when the sheet medium information and the disk medium information are included in the medium information, the user 200 may select content registered in the communication device 120 and setting content of the disk medium printing as the setting content of the setting items 703 to 708.

A medium size 703 indicates setting content of a size of a recording medium used in printing executed by the communication device 120. The user 200 may select one of sizes "A4", "4×6", "12 cm×12 cm", "postcard", "letter", and the like as setting content of the medium size 703. A medium type 704 indicates setting content of a type of the recording medium used in the printing executed by the communication device 120. The user may select one of types "plain paper", "photo paper", "disk", and the like as setting content of the medium type 704. Note that options of the medium size 703 and the medium type 704 (options in the print setting screen 701) may be different from options of the medium size 303 and the medium type 304 (options in the medium information registration screen). For example, a number of detailed options which is larger than those of the medium type 704 may be displayed in the medium type 304. In this case, the communication device 120 transmits information obtained by converting the content registered as the medium size 303 and the medium type 304 into content of the medium size 703 and the medium type 704 to the terminal device 110 as medium information. Specifically, the communication device 120 converts information indicating that "glossy paper" or "mat paper" has been registered as the medium type 304 into "photo paper" and transmits the information to the terminal device 110, for example.

A printing side 705 indicates a result of a determination as to whether the communication device 120 performs single-side printing or double-side printing. The user 200 may select "single side" indicating the single-side printing or "double side" indicating the double-side printing as setting content of the printing side 705. Print quality 706 indicates setting content of finish of printing to be executed by the communication device 120. The user 200 may select quality of printing from among "standard" and "high quality" as the setting content of the print quality 706. A color 707 indicates a result of a determination as to whether the communication device 120 performs color printing or monochrome printing. The user 200 may select a color setting from among "color" and "monochrome" as the setting content of the color 707.

A supply unit 708 indicates a supply source of a recording medium used in the printing executed by the communication device 120. The user 200 may select "ASF" indicating the sheet feeding unit 126 or "disk" indicating the disk medium supply unit 127 as setting content of the supply unit 708. Note that, when the sheet feeding unit 126 includes a plurality of sheet feeding units, the user 200 may select any one of the plurality of sheet feeding units. Furthermore, the user 200 may select "auto" which is content indicating that the communication device 120 automatically selects setting values of the setting items 703 to 708 in a method described below.

As described above, the communication device 120 transmits only the information corresponding to content registered in the medium information registration process (the sheet medium information) to the terminal device 110 when it is determined that the disk medium information is not to be transmitted in the medium information transmission determination. When the medium size information included in the sheet medium information is "A4" and the medium type information included in the sheet medium information is "photo paper", the user 200 may select "A4" as the medium size, "photo paper" as the medium type, and "ASF" as the supply unit. Note that the user 200 may select "auto" in each of the setting items 703 to 708 as described above. On the other hand, the communication device 120 transmits the disk medium information to the terminal device 110 in addition to the sheet medium information when it is determined that the disk medium information is to be transmitted in the medium information transmission determination described below, for example. Therefore, in this case, when the sheet medium information has the content described above, the user 200 may select "A4" and "12 cm×12 cm" as the medium size, "photo paper" and "disk" as the medium type, and "ASF" and "disk" as the supply unit. Note that the user 200 may select "auto" in the setting items 703 to 708 as described above.

Note that setting items settable in the print setting screen 701 and content selectable in the setting items are not particularly restricted. In a case where the communication device 120 does not support the double-side printing, for example, only "single side" may be set in the printing side 705, and therefore, the printing side 705 may not be displayed or only "single side" may be in selectable state. Setting items only having "auto" as options of content may not be displayed. Furthermore, layout of the print setting screen 701 is not particularly restricted. For example, the title 702 may not be displayed. Furthermore, some of the items may be determined in conjunction with one another. When "disk" is selected as the medium type, for example, "12 cm×12 cm" may be automatically selected or options other than "12 cm×12 cm" may not be selectable.

Furthermore, the setting content of the medium size 703 and the medium type 704 may be automatically determined by the terminal device 110 in accordance with the medium information obtained from the communication device 120 in step S504, and therefore, may not be displayed in the print setting screen 701. By this, a user operation of inputting the print setting information may be simplified.

The process in step S505 may be skipped depending on specification of a print application installed in the terminal device 110. Specifically, display of the print setting screen 701 may be omitted. This is because, in a use case where content of setting items is fixed, the user may not change or set the content of the setting items.

In step S506, the user 200 inputs the print setting information through the print setting screen 701 displayed in step S505 and instructs execution of printing.

In step S507, the terminal device 110 transmits the print setting information corresponding to the content of the setting items 703 to 708 input in step S506 and the print job including image data selected by the user 200 to the communication device 120.

In step S508, the communication device 120 executes printing in accordance with the content of the print job received from the terminal device 110. This process will be described hereinafter in detail with reference to FIG. 8.

Note that, although the communication device 120 executes the medium information transmission in step S504 in this embodiment, a timing when the medium information transmission is performed is not limited to this. For example, the medium information transmission may be performed when the terminal device 110 and the communication device 120 are connected to each other through the communication unit 114 and the communication unit 124 for the first time.

Figure 8:
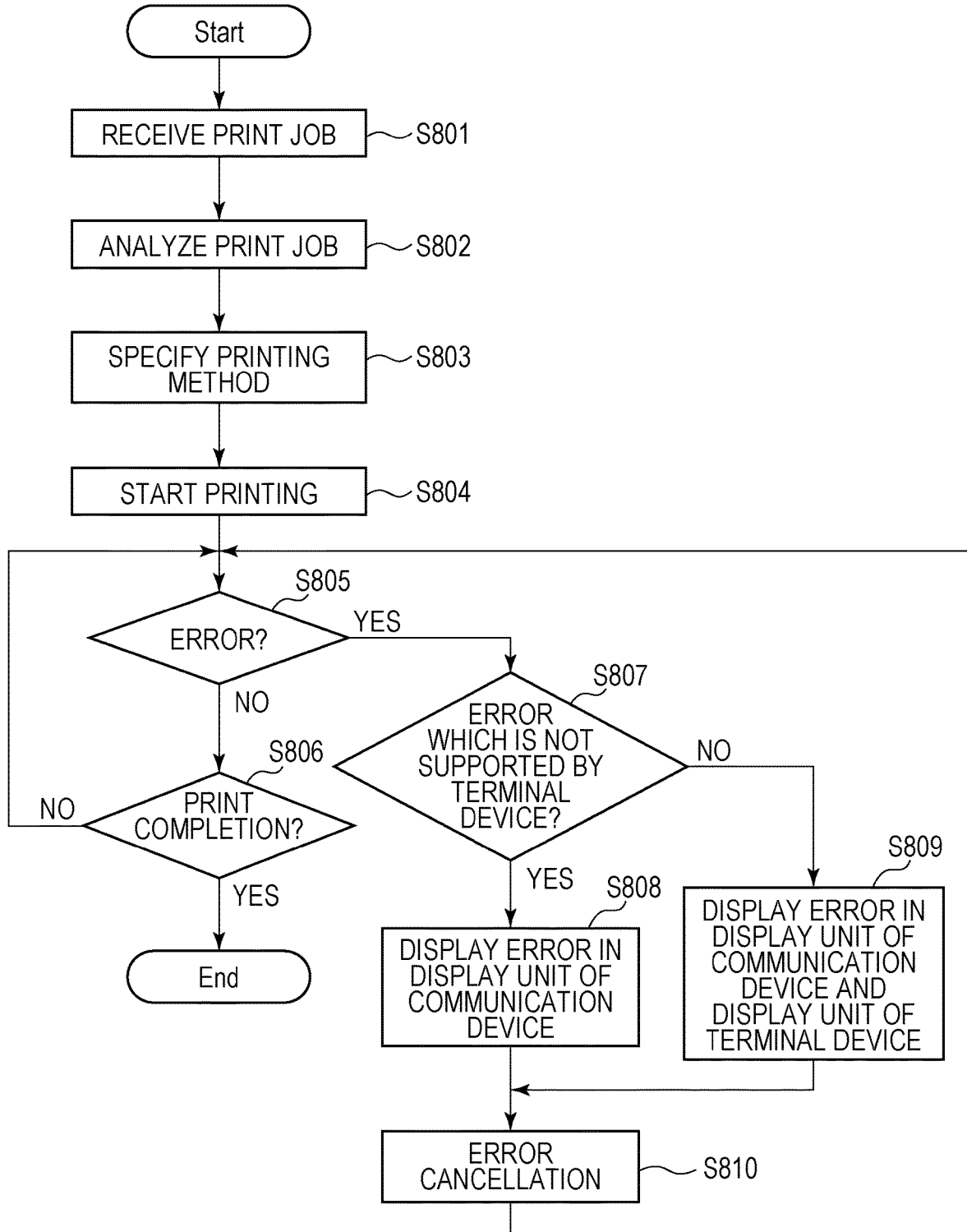
FIG. 8 is a flowchart of a print process executed by the communication device according to the embodiment of the present invention.

FIG. 8 is a flowchart of the print process executed by the communication device 120 according to this embodiment. The process of this flowchart is realized when the CPU 121 reads various programs stored in the memory, such as the ROM 122, into the RAM 123 and executes the programs. Furthermore, the process of this flowchart corresponds to the process in step S508, and therefore, is started when the process in step S507 is completed.

In step S801, the CPU 121 receives a print job from the terminal device 110.

In step S802, the CPU 121 analyzes the received print job. In this embodiment, the print job includes the print setting information corresponding to the content of the setting items 703 to 708 set through the print setting screen 701 and image data. Therefore, the CPU 121 specifically obtains the print setting information and the image data included in the print job.

In step S803, the CPU 121 specifies a printing method employed when printing is performed based on the print job in accordance with the print setting information obtained by the analysis performed in step S802. In a case where the medium size is "A4" and the medium type is "photo paper", for example, content of the items does not correspond to settings of the disk medium printing, and therefore, the CPU 121 specifies the sheet medium printing to be performed on A4 photo paper.

However, information indicating one of the setting items may not be included in the print setting information depending on an OS installed in the terminal device 110, a model of the terminal device 110, or an application which instructs printing, for example. Furthermore, "12 cm×12 cm" is set as the medium size for execution of the disk medium printing as described above. A square sheet having the size "12 cm×12 cm" may also be used in the sheet medium printing. Specifically, in a case where the print setting information includes medium size information "12 cm×12 cm" but does not include the medium type information or the supply unit information, for example, any one of the disk medium printing and the sheet medium printing may be specified. Therefore, in a case where the print setting information includes specific information (the medium size information "12 cm×12 cm" in this embodiment), a process of specifying a printing method is executed in this embodiment. Hereinafter, the process of specifying a printing method will be described in detail with reference to FIG. 9.

The CPU 121 makes the determination using a table in which a printing method to be used, the medium type information, and the supply unit information are associated with one another (hereinafter, referred to as an "association table").

Figure 9:
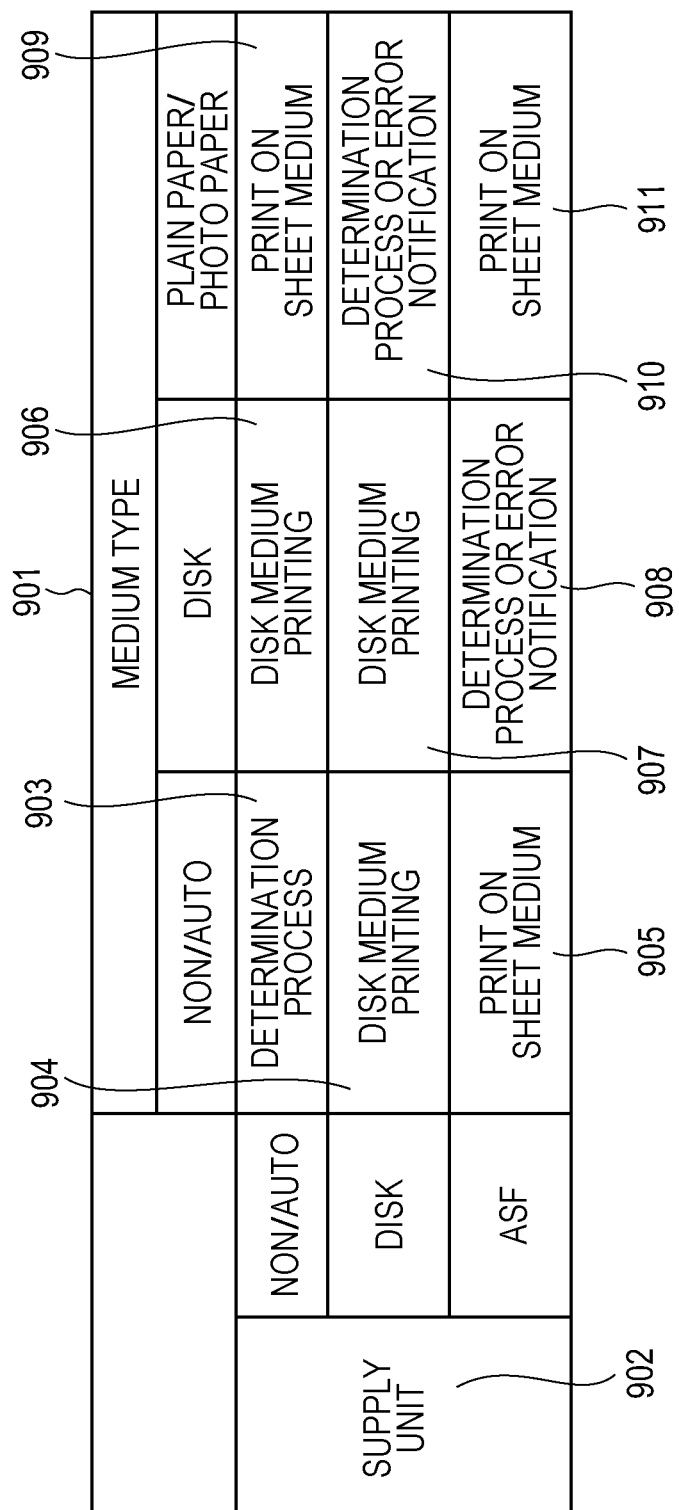
FIG. 9 is a diagram illustrating a table used in a process of specifying a printing method employed in the communication device according to the embodiment of the present invention.

FIG. 9 is a diagram illustrating the association table used when the medium size information included in the print setting information indicates "12 cm×12 cm". In this embodiment, "non/auto", "disk", and "plain paper/photo paper" are set as items of a medium type 901. Furthermore, "non/auto", "disk" indicating the disk medium supply unit 127, and "ASF" indicating the sheet feeding unit 126 are set as items of a supply unit 902. Note that "non" indicates an item to be referred to when the print setting information does not include the medium type information or the supply unit information. The CPU 121 specifies one of printing methods described in the table illustrated in FIG. 9 in accordance with the medium type information and the supply unit information included in the obtained print setting information.

Furthermore, "disk medium printing" and "sheet medium printing" are included in the table of FIG. 9 as printing methods. In the disk medium printing, printing is performed on a disk medium, and therefore, "disk" is selected as the medium type and "disk" is selected as the supply unit in the print setting. Therefore, in a case where the medium type information included in the print setting information indicates "disk" and the supply unit information indicates "disk", the CPU 121 specifies the disk medium printing as a printing method with reference to a pattern 907 in the table of FIG. 9. Furthermore, in the sheet medium printing, printing is performed on a recording medium (such as a sheet) other than a disk medium, and therefore, "plain paper/photo paper" is selected as the medium type and "ASF" is selected as the supply unit. Therefore, in a case where the medium type information included in the print setting information indicates "plain paper/photo paper" and the supply unit information indicates "ASF", the CPU 121 specifies the sheet medium printing as a printing method with reference to a pattern 911.

Furthermore, when one of the medium type information and the supply unit information indicates "non/auto", the CPU 121 specifies a printing method corresponding to the other of the information. Specifically, when the other of the information indicates "disk", the CPU 121 specifies the disk medium printing as a printing method with reference to a pattern 904 or a pattern 906. Furthermore, when the other of the information indicates "plain paper/photo paper" or "ASF", the CPU 121 specifies the sheet medium printing as a printing method with reference to a pattern 905 or a pattern 909.

Furthermore, when both of the medium type information and the supply unit information indicate "non/auto", the CPU 121 specifies the process of determining a printing method with reference to a pattern 903. In the process of determining a printing method, the CPU 121 determines whether the sheet feeding unit 126 holds a sheet using the sheet detection unit 129. When the determination is affirmative, the CPU 121 sets content corresponding to the medium information of the communication device 120 registered in step S207 as the medium type, determines "ASF" as the supply unit information, and therefore, specifies the sheet medium printing. On the other hand, when the determination is negative, the CPU 121 determines "disk" as the medium type and "disk" as the supply unit information in a printing method, and specifies the disk medium printing as a printing method. Note that the CPU 121 may determine whether the disk medium supply unit 127 holds a disk medium using the disk medium detection unit 130 and specify a printing method in accordance with a result of the determination.

Furthermore, in a case where information indicating a medium type indicates "disk" and information indicating the supply unit indicates "ASF", the CPU 121 performs the process of determining a printing method described above with reference to a pattern 908. Furthermore, also in a case where information indicating a medium type indicates "plain paper/photo paper" and information indicating the supply unit indicates "disk", the CPU 121 similarly performs the process of determining a printing method described above with reference to a pattern 910. This is because, since the information indicating the medium type and the information indicating the supply unit do not match each other, one of the disk medium printing and the sheet medium printing to be employed is not uniquely specified. Note that, in the case where the information indicating the medium type and the information indicating the supply unit do not match each other as the cases of the patterns 908 and 910, the CPU 121 may determine that an error has occurred and terminate the job without executing the process of determining a printing method. Alternatively, one of the printing methods to be preferentially specified may be set in advance, and the one of the printing methods may be specified in accordance with the setting.

With this configuration, even in a case where the medium size information included in the print setting information received from the terminal device 110 may be used in both of the disk medium printing and the sheet medium printing, a printing method may be specified in accordance with the medium type information and the supply unit information.

Furthermore, in this embodiment, even in a case where any one of information indicating the setting items is not obtained, such as the medium type information or the supply unit information, or in a case where "auto" is set, a printing method may be specified in accordance with a result of a detection performed by the sheet detection unit 129.

Furthermore, even in a case where set content is not appropriate due to an input error of the user 200, a printing method may be specified in accordance with a result of the detection performed by the sheet detection unit 129 or the disk medium detection unit 130.

Subsequently, in step S804, the CPU 121 performs printing in accordance with the printing method specified in step S803. Specifically, when specifying the disk medium printing, first, the CPU 121 displays a screen for prompting the user 200 to set a disk medium in the disk medium supply unit 127 in the display unit 131. When a disk medium is set by the user, the printing based on the print job is performed on the disk medium supplied from the disk medium supply unit 127. Furthermore, when the sheet medium printing is specified, the CPU 121 performs printing based on the print job on a recording medium supplied from the sheet feeding unit 126.

In step S805, the CPU 121 determines whether an error occurs in the printing performed by the communication device 120. When the determination is negative, the CPU 121 proceeds to step S806 where it is determined whether printing is completed. When the determination is negative in step S806, the process in step S805 is performed again, whereas when the determination is affirmative, the process is terminated.

On the other hand, when the determination is affirmative in step S805, the CPU 121 proceeds to step S807 where it is determined whether an error which is not supported by the terminal device 110 has occurred. A process of determining an error notification will be described below in detail. When the determination is affirmative in step S807, the CPU 121 proceeds to step S808. The CPU 121 displays a screen indicating that an error has occurred (an error notification screen) during the printing in the display unit 131 of the communication device 120 but does not display the error notification screen in the display unit 116 of the terminal device 110. Specifically, the CPU 121 does not transmit information indicating that an error has occurred during the printing to the terminal device 110.

On the other hand, when the determination is negative in step S807, the CPU 121 proceeds to step S809 where the CPU 121 displays the error notification screen in both of the display unit 131 and the display unit 116. Note that, in this case, the CPU 121 transmits the information indicating that an error has occurred during the printing to the terminal device 110 so that the information is displayed in the display unit 116. Note that not only the information indicating that an error has occurred during the printing but also an operation method for cancelling the generated error may be displayed in the error notification screen displayed in step S808 and step S809.

Subsequently, the CPU 121 accepts a user operation of cancelling the generated error in step S810. The operation of cancelling the generated error corresponds to an operation of exchanging ink if the generated error indicates shortage of ink. The operation of cancelling the generated error corresponds to an operation of supplying a recording medium corresponding to the printing method specified in step S803 if the generated error indicates shortage of sheet or absence of disk. If the error is cancelled, the CPU 121 restarts the printing which has been interrupted due to the occurrence of the error and performs the process in step S805 again.

Here, the process of determining an error notification in step S807 will be described in detail. The error which is not supported by the terminal device 110 (hereinafter referred to as "unsupported error") indicates an error unique to the disk medium printing, for example. This is because, in a case where communication between the devices is performed in accordance with the standard system protocol, even if an error unique to the disk medium printing is transmitted to the terminal device 110, a screen for the error unique to the disk medium printing may not be displayed in the terminal device 110. A reason that the screen for the error unique to the disk medium printing may not be displayed in the terminal device 110 will be described below.

Examples of the error unique to the disk medium printing include a "disk absence error", a "tray absence error", and a "tray discharging error". The "disk absence error" indicates a state in which the disk medium supply unit 127 does not hold a disk medium. The "tray absence error" indicates a state in which a disk medium tray has not been inserted into the disk medium supply unit 127. The "tray discharging error" indicates a state in which a tray may not be discharged since the cover of the insertion slot of the tray is closed. Note that examples of an error which is not unique to the disk medium printing include a "sheet shortage error" indicating a state in which the sheet feeding unit 126 does not hold a medium and an "ink shortage error" indicating a state in which the communication device 120 is short of ink.

Specifically, the CPU 121 determines whether a printing method employed in the printing currently performed is the disk medium printing in step S807. The CPU 121 performs the determination in accordance with the type of the printing method specified in step S803 and various information (such as the supply unit information and the medium type information) included in the received print setting information.

When determining that the printing method employed in the current printing is not the disk medium printing, the CPU 121 determines that the error which currently occurs is not unsupported error. On the other hand, when determining that the printing method employed in the current printing is the disk medium printing, the CPU 121 determines whether the current error is the error unique to the disk medium printing. The CPU 121 performs the determination in accordance with error list information stored in the ROM 122 of the communication device 120. When determining that the current error is not the error unique to the disk medium printing, the CPU 121 determines that the current error is not unsupported error. On the other hand, when determining that the current error is the error unique to the disk medium printing, the CPU 121 determines that the current error is unsupported error.

After the process in step S807, the CPU 121 displays the error notification screen in the display unit 131 and the display unit 116 in accordance with a result of the determination in step S807 as described above.

The reason that the error notification screen is not displayed in the display unit 116 when the generated error is the unsupported error will now be described.

To display the error notification screen in the display unit 116, information indicating that an unsupported error has occurred during the printing is required to be transmitted to the terminal device 110. However, the terminal device 110 does not support display of the screen for notification of information indicating that an unsupported error has occurred, and therefore, the terminal device 110 may not display the error notification screen even if receiving the information. Specifically, in the case where the generated error is an unsupported error, the information indicating that the unsupported error has occurred during the printing is transmitted in vain. Therefore, as described above, since the display unit 116 does not display the error notification screen when the unsupported error has occurred, the information indicating that the unsupported error has occurred is not transmitted in vain.

If the unsupported error is the disk absence error, when receiving the information indicating that the disk absence error has occurred, the terminal device 110 may mistakenly recognize that the sheet shortage error has occurred depending on specification of the installed OS. Furthermore, it is assumed that the same error information (the information indicating that the medium absence error has occurred) is transmitted also in a case where the communication device 120 does not distinguish the disk absence error and the sheet shortage error from each other and one of the errors occurs, for example. Also in this case, the terminal device 110 may mistakenly recognize that the sheet shortage error has occurred depending on the specification of the installed OS although the disk absence error has occurred.

Note that a method for cancelling the error unique to the disk medium printing is different from a method for cancelling an error which has occurred during the sheet medium printing, and therefore, a screen of the method for cancelling the error unique to the disk medium printing is different from a screen of the method for cancelling an error which has occurred during the sheet medium printing. Therefore, if the terminal device 110 mistakenly recognizes that the sheet shortage error has occurred although the disk absence error has occurred, the display unit 131 and the display unit 116 display different error notification screens. Accordingly, as described above, since the display unit 116 does not display the error notification screen when the generated error is an unsupported error, an appropriate screen is displayed only in the display unit 131, and therefore, confusion of the user may be suppressed.

Furthermore, in general, only one disk medium may be set in the disk medium supply unit 127. Therefore, in a case where the disk medium printing is successively performed, it may be determined that the medium absence error has occurred when the communication device 120 intends to execute printing on a second disk medium onwards after printing on a first disk medium is completed. In this embodiment, the error notification screen is not displayed in the terminal device 110 even if an error occurs during the disk medium printing, and therefore, transmission of notification of the medium absence error transmitted when the disk medium printing is successively performed may be suppressed. Note that, in this embodiment, the error notification screen is displayed only in the communication device 120 during the disk medium printing. However, the present invention is not limited to this. For example, the error notification screen for notification of the medium absence error may not be displayed also in the communication device 120. In this case, instead of the error notification screen for the notification of the medium absence error, a screen for prompting the user to newly set a disk medium may be displayed.

Note that the CPU 121 may change an error notification method depending on a determination as to whether the communication between the devices is executed in accordance with the standard system protocol or the non-standard system protocol supported by the communication device 120. In this case, after the process in step S805, the CPU 121 determines whether the communication between the devices is executed in accordance with the standard system protocol or the non-standard system protocol supported by the communication device 120. When determining that the communication between the devices is executed in accordance with the standard system protocol, the CPU 121 executes the process in step S807 onwards. On the other hand, when determining that the communication between the devices is executed in accordance with the non-standard system protocol supported by the communication device 120, the CPU 121 displays the error notification screen in both of the display unit 131 and the display unit 116. Specifically, information indicating that an error has occurred in the communication device 120 is transmitted to the terminal device 110. This is because, in the case where the communication between the devices is executed in accordance with the non-standard system protocol supported by the communication device 120, the terminal device 110 may recognize the error notification information and display screens corresponding to individual errors. Specifically, this is because a screen indicating the error cancelling method may be displayed even in the case where the generated error is the error unique to the disk medium printing.

With this configuration, usability of the disk medium printing through the terminal device 110 may be improved.

Other Embodiments

Note that the communication system of this embodiment may include a server which relays the communication between the terminal device 110 and the communication device 120, and the server may perform the medium information transmission determination, the printing method specifying process, and the error notification determination process. In this case, the server may obtain information required for the processes and the determination from the communication device 120 and the terminal device 110.

Note that, although it is determined whether the disk medium information is to be transmitted to the terminal device 110 in the medium information transmission determination in the foregoing embodiment, the present invention is not limited to this. Specifically, the medium information to be subjected to the medium information transmission determination may be information indicating another medium instead of the disk medium information as long as the medium information may not be registered in the disk medium information registration process.

Although the printing method specifying process is executed by the communication device 120 in the foregoing embodiment, the present invention is not limited to this. Specifically, the printing method specifying process may be executed by the terminal device 110 when the print setting information is input by the user, for example. In this case, if information indicating a result of detection by the sheet detection unit 129 or the disk medium detection unit 130 is required for the printing method specifying process, the terminal device 110 obtains the information from the communication device 120 where appropriate. When the specifying of the printing method is completed, the terminal device 110 transmits information indicating the specified printing method to the communication device 120.

Although only an option of medium information, that is, information indicating a medium held by the communication device 120, is displayed in the print setting screen 701 in the foregoing embodiment, the present invention is not limited to this. For example, the terminal device 110 may obtain information indicating a function of the communication device 120 (functional information) from the communication device 120 and display an option of the functional information in addition to the option of the medium information in the print setting screen 701. In the printing based on the standard system protocol, the terminal device 110 may not display an option of the functional information in the print setting screen 701 depending on a type of the OS installed in the terminal device 110. Specifically, the terminal device 110 may display only the option of the medium information. In this embodiment, to display an option associated with the disk medium printing in the print setting screen 701, medium information corresponding to the disk medium printing is transmitted instead of the functional information corresponding to the disk medium printing. By this, an option associated with the disk medium printing may be displayed also in the terminal device 110 described above.

The foregoing embodiment may be realized by executing the following process. Specifically, software (programs) which realizes the functions of the foregoing embodiment is supplied to a system or an apparatus through a network or various storage media, and a computer (a CPU or an MPU) of the system or the apparatus reads and executes the programs. The programs may be executed by one computer or executed by a plurality of computers operating in combination. Furthermore, all the processes are not to be realize and some of or all the processes described above may be realized by hardware, such as ASIC. Furthermore, only one CPU may execute a plurality of processes or a plurality of CPUs may perform the processes in combination where appropriate.

According to the present invention, usability in the print setting operation may be improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing device comprising:
 a first holding unit which is configured to hold a first recording medium which is disk-like and capable of storing information;
 a second holding unit which is configured to hold a second recording medium which is different from the first recording medium; and
 at least one processor, wherein the at least one processor performs operations comprising:
  receiving a print job from a terminal device;
  in a case where a predetermined size is specified by the print job as a size of a recording medium on which printing is performed based on the print job and a holding unit for supplying the recording medium on which the printing is performed based on the print job is not specified by the print job, performing the printing on either of the first recording medium or the second recording medium depending on which of the first recording medium and the second recording medium is specified as a type of the recording medium on which the printing is performed based on the print job; and
  in a case where a size other than the predetermined size is specified by the print job as the size of the recording medium on which the printing is performed based on the print job, not performing the printing on the first recording medium and performing the printing on the second recording medium.

2. The printing device according to claim 1, wherein, in a case where the predetermined size is specified by the print job as the size of the recording medium on which the printing is performed based on the print job, the first recording medium is specified by the print job as the type of the recording medium on which the printing is performed, and the first holding unit is specified by the print job as the holding unit for supplying the recording medium on which the printing is performed based on the print job, the printing is performed on the first recording medium.

3. The printing device according to claim 1, the operations further comprising:

in a case where the predetermined size is specified by the print job as the size of the recording medium on which the printing is performed based on the print job, the type of the recording medium on which the printing is performed based on the print job is not specified by the print job, and the holding unit for supplying the recording medium on which the printing is performed based on the print job is not specified by the print job, determining which of the first recording medium and the second recording medium the printing is performed on.

4. The printing device according to claim 3, wherein it is determined that, in a case where the first recording medium is set in the first holding unit, the printing is performed on the first recording medium, and wherein it is determined that, in a case where the first recording medium is not set in the first holding unit, the printing is performed on the second recording medium.

5. The printing device according to claim 3, wherein it is determined that, in a case where the second recording medium is set in the second holding unit, the printing is performed on the second recording medium, and wherein it is determined that, in a case where the second recording medium is not set in the second holding unit, the printing is performed on the first recording medium.

6. The printing device according to claim 1, the operations further comprising:

in a case where the predetermined size is specified by the print job as the size of the recording medium on which the printing is performed based on the print job, the first recording medium is specified by the print job as the type of the recording medium on which the printing is performed based on the print job, and the second holding unit is specified by the print job as the holding unit for supplying the recording medium on which the printing medium is performed based on the print job, determining which of the first recording medium and the second recording medium the printing is performed on.

7. The printing device according to claim 1, wherein, in a case where the predetermined size is specified by the print job as the size of the recording medium on which the printing is performed based on the print job, the first recording medium is specified by the print job as the type of the recording medium on which the printing is performed based on the print job, and the second holding unit is specified by the print job as the holding unit for supplying the recording medium on which the printing is performed based on the print job, the printing is performed on either of the first recording medium and the second recording medium based on a predetermined setting.

8. The printing device according to claim 1, the operations further comprising:

in a case where the predetermined size is specified by the print job as the size of the recoding medium on which the printing is performed based on the print job, the second recording medium is specified by the print job as the type of the recording medium on which the printing is performed based on the print job, and the first holding unit is specified by the print job as the holding unit for supplying the recoding medium on which the printing is performed based on the print job, determining which of the first recording medium and the second recording medium the printing is performed on.

9. The printing device according to claim 1, wherein, in a case where the predetermined size is specified by the print job as the size of the recoding medium on which the printing is performed based on the print job, the second recording medium is specified by the print job as the type of the recording medium on which the printing is performed based on the print job, and the first holding unit is specified by the print job as the holding unit for supplying the recoding medium on which the printing is performed based on the print job, the printing is performed on either of the first recording medium and the second recording medium based on a predetermined setting.

10. The recording device according to claim 1, wherein the predetermined size is 12 cm by 12 cm.

11. The recording device according to claim 1, wherein the print job is received through communication in accordance with a standard system protocol.

12. The recording device according to claim 11, wherein the standard system protocol is an internet printing protocol (IPP) or a web services on devices (WSD).

13. The printing device according to claim 1, the operations further comprising:

transmitting information indicating the first recording medium to a terminal device;

transmitting, to the terminal device, information indicating the second recording medium selected, as the second recording medium held by the second holding unit, by an operation by a user to a display device which displays a plurality of the second recording media the second holding unit can hold, or information indicating the second recording medium detected, as the second recording medium held by the second holding unit, by the communication device, wherein an item corresponding to the information indicating the first recording medium is displayed in the terminal device so as to be selectable by the user in a case that the information indicating the first recording medium is transmitted to the terminal device, an item corresponding to the information indicating the second recording medium is displayed in the terminal device so as to be selectable by the user in a case that the information indicating the second recording medium is transmitted to the terminal device, in a case that the item corresponding to the information indicating the first recording medium is selected by user on the terminal device, the print job including a print setting information corresponding to the first recording medium is transmitted to the printing device, in a case that the item corresponding to the information indicating the second recording medium is selected by user on the terminal device, the print job including a print setting information corresponding to the second recording medium is transmitted to the printing device.

14. The printing device according to claim 1, the operation further comprising:

receiving a request for information indicating a recording medium which is usable by the printing device from the terminal device.

15. The printing device according to claim 1, wherein the request is received when a predetermined program for executing communication based on a standard system protocol is activated in the terminal device.

16. The printing device according to claim 1, the operations further comprising:
    transmitting information indicating a function executable by the communication device to the terminal device when a printer driver for executing communication based on a non-standard system protocol which is different from the predetermined program is installed in the terminal device.

17. The printing device according to claim 1, wherein the first recording medium is one of a compact disc, a digital versatile disc (DVD), and a Blu-ray disc.

18. The printing device according to claim 1, wherein the second recording medium is paper.

19. The printing device according to claim 1, wherein, in a case where the predetermined size is specified by the print job as the size of the recoding medium on which the printing is performed based on the print job, and the type of the recording medium on which the printing is performed based on the print job is not specified by the print job, the printing is performed on either of the first recording medium and the second recording medium depending on which of the first holding unit and the second holding unit is specified as the holding unit for supplying the recording medium on which the printing is performed based on the print job.

20. A printing device comprising:
    a first holding unit which is configured to hold a first recording medium which is disk-like and capable of storing information;
    a second holding unit which is configured to hold a second recording medium which is different from the first recording medium; and
    at least one processor, wherein the at least one processor performs operations comprising:
    receiving a print job from a terminal device;
    in a case where a predetermined size is specified by the print job as a size of a recording medium on which printing is performed based on the print job and a type of the recording medium on which the printing is performed based on the print job is not specified by the print job, the printing is performed on either of the first recording medium and the second recording medium depending on which of the first holding unit and the second holding unit is specified as a holding unit for supplying the recording medium on which the printing is performed based on the print job;
    in a case where a size other than the predetermined size is specified by the print job as the size of the recording medium on which the printing is performed based on the print job, not performing the printing on the first recording medium and performing printing on the second recording medium;
    perform printing on the first recording medium or the second recording medium;
    in a case where a first error regarding at least one of the first holding unit and the first recording medium occurs in the printing device after receiving the print job, not performing processing for causing the terminal device to perform notification regarding the first error; and
    in a case where a second error different from the first error occurs in the printing device after receiving the print job, performing processing for causing the terminal device to perform notification regarding the second error.

* * * * *